B. R. BRIERLY & E. H. WAUGH.
SCRAPER ATTACHMENT FOR FISH CLEANING MACHINES.
APPLICATION FILED APR. 29, 1916.
1,223,468.
Patented Apr. 24, 1917.
4 SHEETS—SHEET 1.
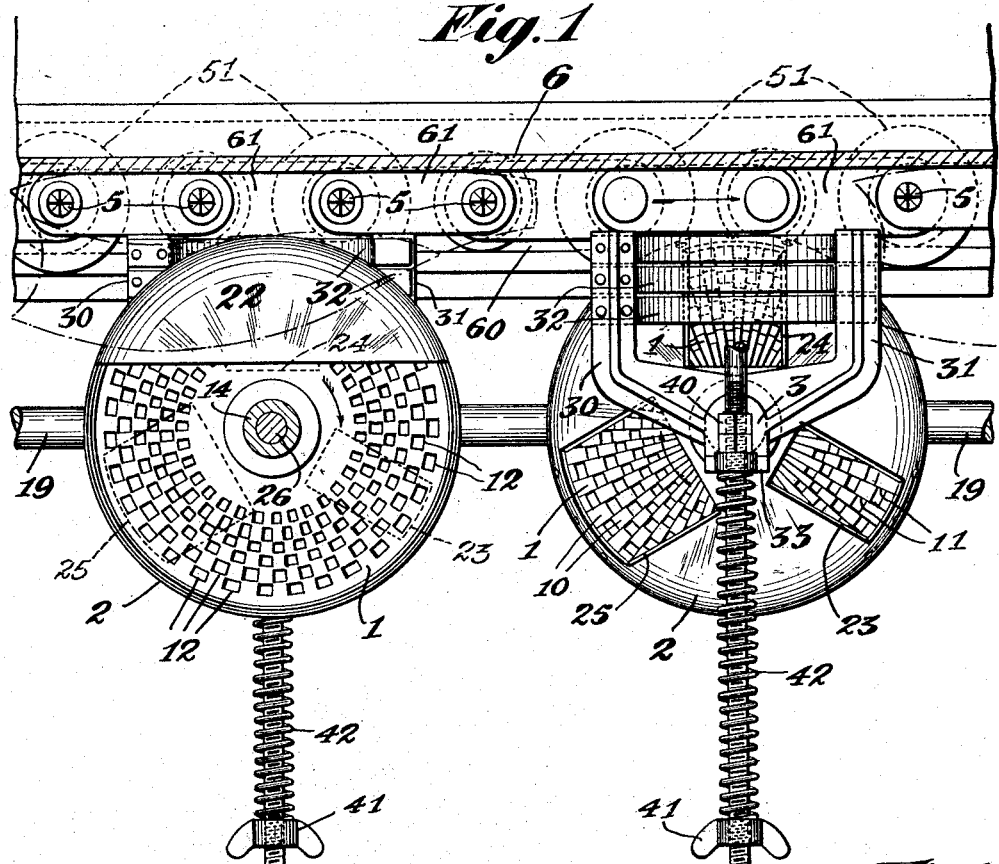
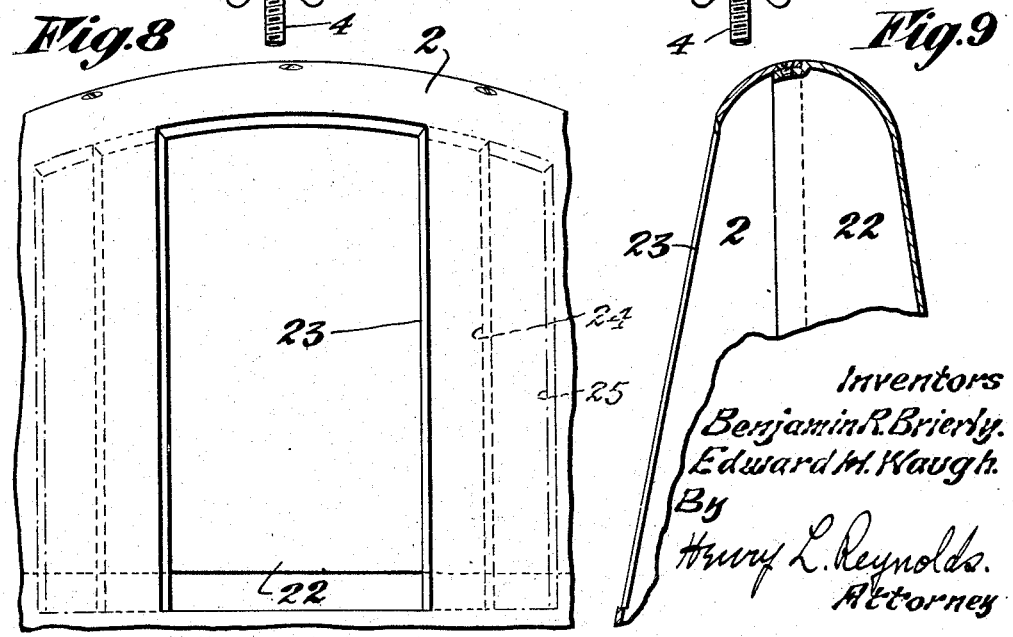
Inventors
Benjamin R. Brierly.
Edward H. Waugh.
By
Henry L. Reynolds.
Attorney B. R. BRIERLY & E. H. WAUGH.
SCRAPER ATTACHMENT FOR FISH CLEANING MACHINES.
APPLICATION FILED APR. 29, 1916.
1,223,468.
Patented Apr. 24, 1917.
4 SHEETS—SHEET 2.
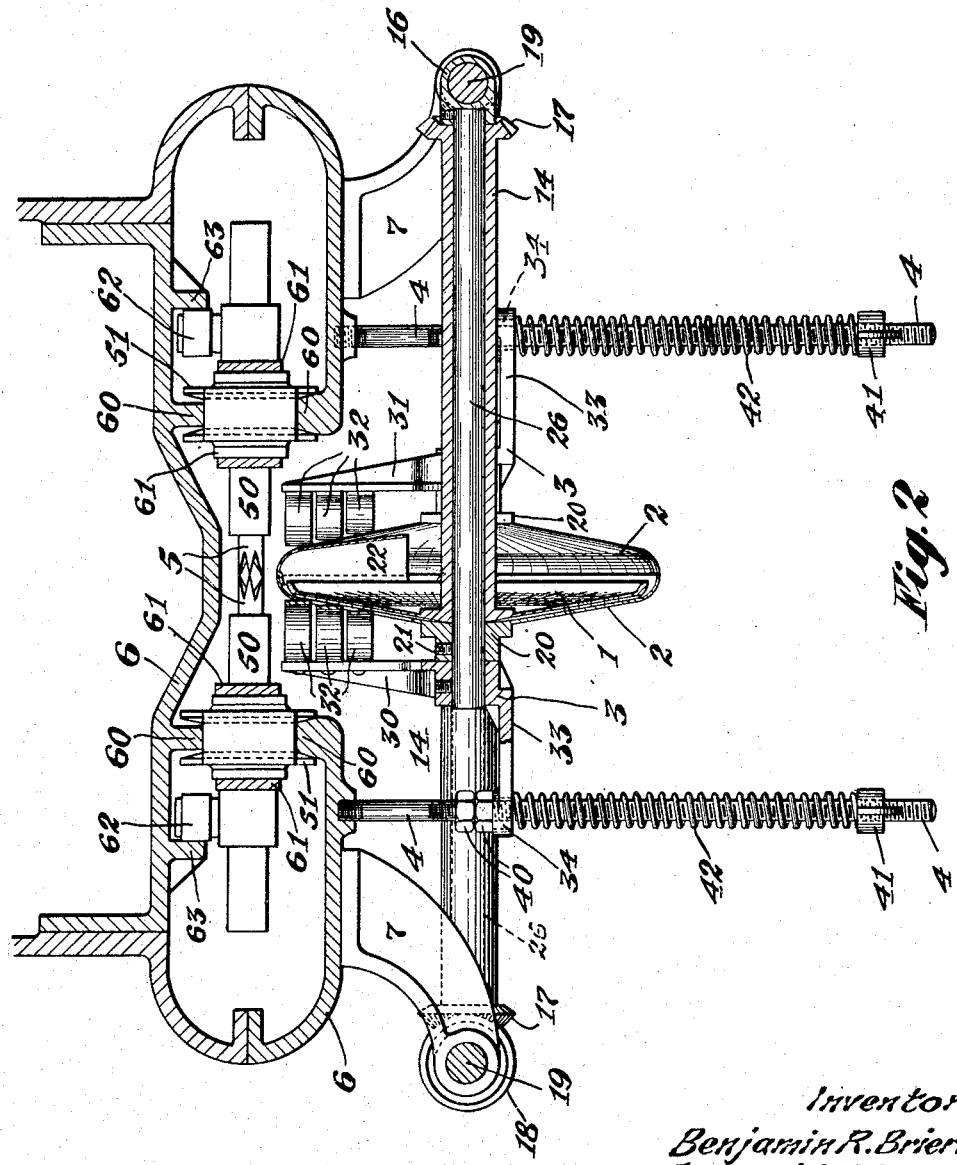

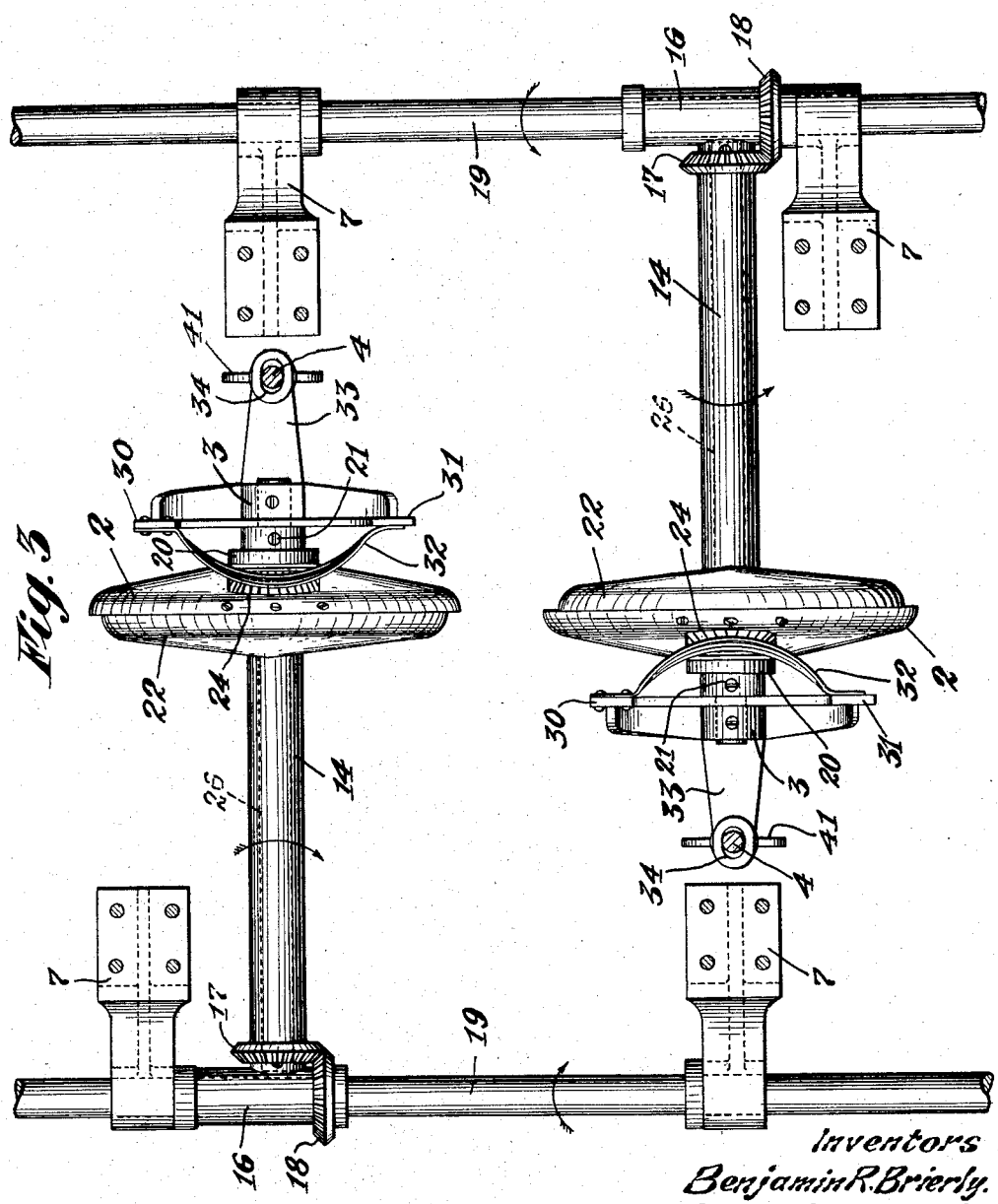

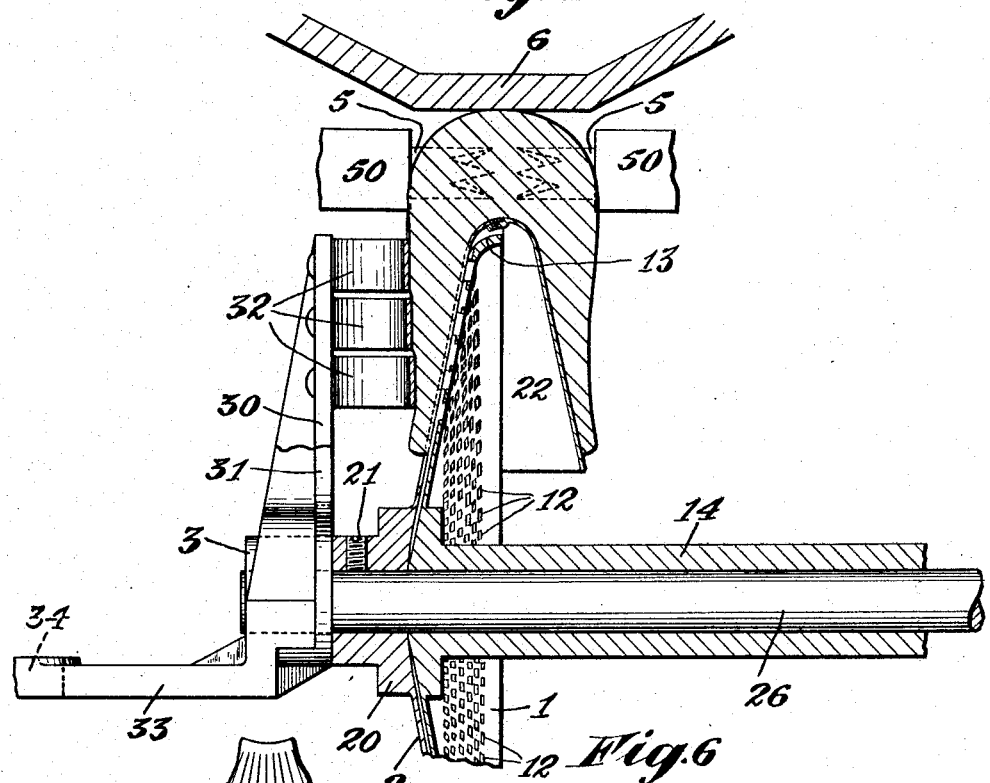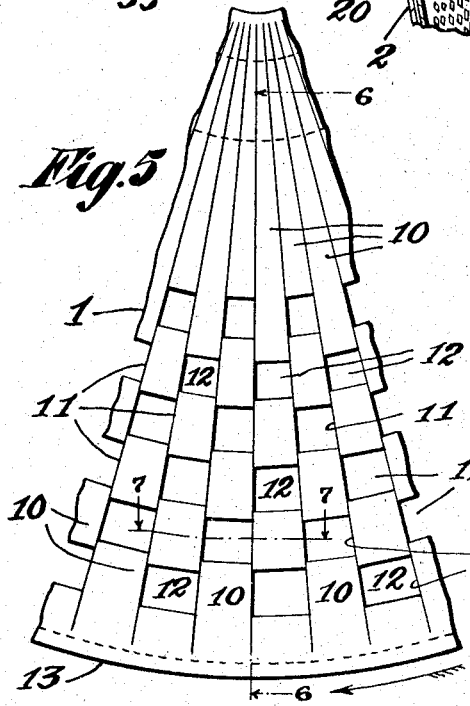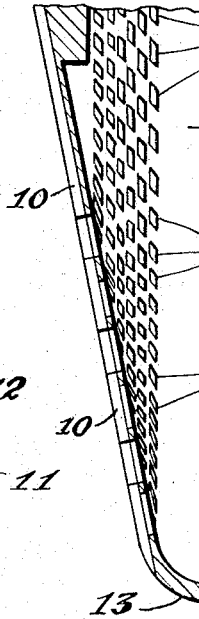

UNITED STATES PATENT OFFICE.

BENJAMIN R. BRIERLY AND EDWARD H. WAUGH, OF SEATTLE, WASHINGTON, ASSIGNORS TO SMITH CANNERY MACHINES COMPANY, OF SEATTLE, WASHINGTON, A CORPORATION OF WASHINGTON.

SCRAPER ATTACHMENT FOR FISH-CLEANING MACHINES.

1,223,468. Specification of Letters Patent. Patented Apr. 24, 1917.

Application filed April 29, 1916. Serial No. 94,498.

*To all whom it may concern:*

Be it known that we, BENJAMIN R. BRIERLY and EDWARD H. WAUGH, citizens of the United States, and residents of the city of Seattle, county of King, State of Washington, have invented certain new and useful Improvements in Scraper Attachments for Fish-Cleaning Machines, of which the following is a specification.

Our invention relates to fish cleaning apparatus, and consists of an apparatus to be attached to fish cleaning machines, having for its purpose the thorough cleaning of the visceral cavity after the same has been opened up by other mechanism and roughly cleaned.

The object of our invention is to thoroughly clean the inside surface of the side walls of this cavity, so that later hand cleaning may be avoided.

Our invention comprises the novel parts and combinations of parts, which will be hereinafter described and then particularly defined in the claims.

In the accompanying drawings we have shown our invention in the form of construction which is most preferred by us. We are however, aware that modifications of this structure in detail may be made, and that such modifications will be capable of producing good results. Whatever modifications fall within the scope of the terms contained in our claims are intended to be covered by us.

Figure 1 is a side view of our device, showing a fragment of the frame and other parts of the assembled machine upon which it is mounted, the latter being partially in section.

Fig. 2 is a section taken transversely to the path of movement of the fish, the frame and one part of the cleaning mechanism being shown in section.

Fig. 3 is a plan view of our cleaning devices, showing only the brackets of the frame from which the device is mounted.

Fig. 4 is a section of one of our devices on a larger scale, showing a fish being operated upon.

Fig. 5 is a face view on a larger scale of a segment of one of the cleaning disks.

Fig. 6 is a section through a part of one of these cleaning disks.

Fig. 7 is a fragmentary perspective illustrating the relationship between the grooves and the holes of the scraping disk.

Fig. 8 is a face view of a portion of one of the guard plates, and Fig. 9 is a transverse section thereof.

Our device is intended to be mounted upon a fish cleaning machine which carries a series of apparatus designed to operate in succession upon the fish, and each performing its particular part of the cleaning operation. It has not been thought necessary to herein show the entire organized machine. This machine in the form of construction herein contemplated, employs frame parts which are herein clearly indicated by the reference character 6, said frame being provided with guide ways 60, which return upon themselves to make a close path, and which are engaged by guide wheels or pulleys 51 which are connected by means of links 61, so as to form an endless chain passing about the entire length of the guide ways. These chains are provided with fish holding points 5 which may slide axially in shafts 50, upon which shafts are rotatably secured wheels 51. Pins 5 are moved inward and outward as may be necessary to engage and disengage the fish, through the engagement of cam rollers 62 with cam tracks 63. As the fish holding and carrying mechanism is, in detail, not part of our present invention, we do not think it necessary to further describe these parts. It is sufficient to say that the fish are moved lengthwise through a predetermined path, and that the apparatus which forms our present invention is mounted in position to engage the fish as they pass.

As a base for the support of the apparatus which forms our present invention, two shafts 19 are journaled in brackets or arms 7, these shafts extending parallel with the chosen portion of the path of travel of the fish. They are herein shown as beneath the machine, this being, however, only incidental to the other features of construction and not an essential relation. The location might be other than this, in case it was more convenient to so place the apparatus.

Upon the shafts 19 are mounted sleeves 16, and a shaft 26, shown more clearly in Figs. 2 and 4, is secured to each sleeve 16, and projects laterally across the machine to a point somewhat beyond the center line of the machine. This shaft is in reality a frame member of the attachment, and upon this is journaled the sleeve 14, which sleeve is a rotative member, being in its function a hollow shaft.

The longitudinally extending driving shafts 19 are provided with bevel gears 18, which mesh with bevel gears 17 secured to the adjacent end of the hollow shaft or sleeve 14. Two devices of like character and construction, but projecting from opposite sides of the machine, and having their parts engaged in opposite relation are employed. A description of one will apply to the other.

Upon the end of the hollow shaft or sleeve 14, which is toward the center line of the machine, is mounted a rotative scraping disk 1. This disk is preferably concaved so as to approximate toward the shape of the interior cavity of the fish. The convex side of this disk faces away from the end of the shaft 14, which is toward the drive shaft 19.

This scraping disk, has its outer or convexed surface roughened, or so formed as to form a flesh scraping surface, for engagement with the inner wall of the visceral cavity of the fish. The preferred manner of securing this scraping surface, is to provide the disk with grooves, of preferably a triangular cross section, as is shown in Fig. 7, the broad surface 10 facing outwardly, while the surfaces 11 approximate toward a perpendicular to the face of the disk. The position of these surfaces is such that the perpendicular surface 11 faces in the direction in which the disk is rotated, whereby the outer angle joining the two surfaces acts as a dull scraper to engage the side of the fish, and clear it of all particles which should be removed.

To further assist in the action of the device, the grooves are provided with holes 12 passing through the disk, these holes being placed so as to extend to the edges 11, and also that the holes in successive groups are in staggered relation, as is clearly seen in Fig. 5. This provides means for the convenient escape of any substances removed by the scraping edges 11, thereby making the device promptly and effectively self clearing. It may be noted that the scraping surface of the disk operates a little short of the extreme outer edge of the disk, and that therefore the bottom median section of the cavity will not be cleaned by the device as herein constructed. This particular part of the cavity is intended to be operated upon by another and independent device.

To prevent the possibility of excessive scraping of the interior surface of the fish, we have provided a shield which protects the fish from the action of the scraping disk, except in limited sector of its revolution.

This guard or shield 2, is a thin metal disk, shaped to conform to the outer shape of the scraping disk, close against which it fits. It is provided with openings as 23, 24 and 25, and may be adjusted so as to bring any one of these three openings into operating position.

The provision of a plurality of openings in this disk, and their adjustment as described, is merely one means for adjusting the size of the opening, and thereby varying the amount of action of the scraping disk upon the fish. This adjusting feature might be dispensed with or secured by other means. It is a desirable feature as the extent to which it is desirable to subject the fish to the scraping action will vary with the condition of the fish. If the flesh of the fish is firm and hard, it will stand a heavier scraping than if the flesh of the fish is soft.

These changes in the condition of the fish are produced by the condition at the time they are caught by the length of the time which may have elapsed since they were caught, and by the conditions to which they may have been subjected to since they were caught. The larger openings may be used when the flesh of the fish is firm, the middle sized opening when the flesh is somewhat softer, and the smallest opening when the flesh is quite soft. While we have shown three openings in the number of openings to be used will depend upon circumstances and the ability to get them within the area of the guard shield.

Upon the swinging end of the shaft 26 is secured a member 3, which is provided with two upwardly projecting and separated arms 30 and 31, these arms being placed before and facing the fish at the point where it is acted upon by the scraping disk. These arms carry spring guides 32, which engage with the outer surface of the fish in its passage, and hold it conveniently toward the scraping disk. These spring presser feet, as herein shown, consist of flat bars of spring metal, which are secured to one of the arms, as 30 and are bowed toward the fish, the outer end extending to an engagement with the other arm 31.

A supplemental guide 22, which is preferably shaped as a sector of a disk similar to the guard disk 2, is secured by its outer edge to the outer edge of the disk 2, and engages the opposite inner wall of the visceral cavity of the fish in passing. This supplemental guard 22 is not a scraper, but is simply intended to merely hold the fish in place, and to prevent the material which is scraped off by the disk 1, from being thrown out into contact with the opposite wall of the fish where portions thereof might strike.

The scraping devices as above described are mounted so as to have varying movement toward and from the fish, in order to automatically accommodate fish of different sizes. The hinging of the shaft 26 upon the driving shaft 19 is with this object in view. The swinging end of the device should be spring supported in a manner to hold it upward or toward the fish. The manner which we have shown for accomplishing this result consists of providing the member 3 with an arm 33, which at its outer end is provided with a slot 34 through which passes a threaded rod 4, the upper end of which is secured to the main frame 6, and upon which, beneath the arm 33, is placed a coil spring 42. The tension of this spring may be adjusted by a nut 41, screwed upon the lower end thereof. The upward movement of the device may be limited by means of lock nuts 40 screwed upon bar 4 above the arm 33.

In operation the fish are carried by means of the points 5, which engage the fish from the opposite sides so as to be moved in the direction indicated by the arrow in Fig. 1. The fish has previously had the head removed, and has been slit lengthwise a sufficient distance along the median lower line to open up the visceral cavity, and has also had this cavity roughly cleaned. As it reaches the present device the sides of the fish will be separated so as to pass on opposite sides of the guard shields 2 and 22, or will occupy the position shown in Fig. 4. As it passes the two devices of the kind described, first, one side and then the other, will be thoroughly scraped and cleaned.

What we claim as our invention is:

1. A scraping device for fish comprising a rotative member having an exterior scraping surface and a shield therefor permitting the free passage of the fish thereover, and having an opening exposing a portion of said scraping surface.

2. A scraping device for fish comprising a rotative member having an exterior scraping surface and a shield therefor having a plurality of openings of different size, and adjustable to thereby control the area of the scraping surface exposed.

3. A scraping device for fish comprising a rotative scraping member having a grooved exterior surface and a shield therefor having a plurality of openings therein, of different size and adjustable to thereby control the exposed area of said scraping surface.

4. A scraping device for fish comprising a rotative scraping member, having projecting ribs extending in a general radial direction and a series of holes located each in advance of a rib, and a shield for said scraping member having an opening exposing a limited area of the surface of the scraping member.

5. A scraping device for fish comprising a rotative scraping member, having a roughened exterior surface and a series of holes therethrough, a shield for the scraping member having a plurality of holes of different size and adjustable to thereby control the working area of the scraping surface.

6. A scraping device for fish comprising a disk-like rotative member, having one face radially grooved to form scraping edges and perforated in advance of said scraping edges to form discharge channels for the material scraped off.

7. A scraping device for fish comprising a rotative member, having its working face grooved to form scraping edges and perforations in said grooves to form discharge openings, and occupying staggered positions in consecutive grooves.

8. A scraping device for fish comprising a rotative member, having its working face provided with grooves of triangular cross section extending transversely of the direction of movement of the scraping surface, and perforations in said grooves forming discharge channels for the material removed.

9. A device for cleaning the visceral cavity of fish, comprising a rotative disk convexed to fit against an inner wall of said cavity and having its convex surface roughened, and a stationary shield fitting closely against the roughened surface of said disk and between said surface and the fish, and provided with an opening through which the scraping surface of the disk may act, the surface of said shield being unobstructed and permitting free passage of the fish thereover.

10. A device for cleaning the visceral cavity of fish, comprising a rotative disk convexed to fit against an inner wall of said cavity and having holes therethrough forming scraping edges, and a shield covering portions of the scraping face of the said disk, the surface of said shield being unobstructed and permitting free passage of the fish thereover.

11. A device for cleaning the visceral cavity of fish, comprising a rotative disk convexed to fit against an inner wall of said cavity and having holes therethrough arranged in radial rows, the holes of successive rows being staggered.

12. A device for cleaning the visceral cavity of fish, comprising a rotative disk convexed to fit against an inner wall of said cavity and having grooves in its convexed surface extending between inner and outer points, and having one face making a large angle with the plane of rotation.

13. A device for cleaning the visceral cavity of fish, comprising a rotative disk convexed to fit against an inner wall of said cavity and having grooves in its convexed surface extending between inner and outer points, and having a side face making a high angle with the plane of rotation, and holes extending through the disk and located in said grooves.

14. A device for cleaning the visceral cavity of fish, comprising a rotative disk convexed to fit against an inner wall of said cavity and having its convex surface roughened, and a shield plate closely fitting to the roughened surface of the disk and having a hole therein exposing a section of the scraper disk, the outer surface of said shield plate being unobstructed and permitting the free passage of fish thereover.

15. A device for cleaning the visceral cavity of fish, comprising a rotative disk convexed to fit against an inner wall of said cavity and having its convex surface roughened, and a protective plate for said disk having openings therein of different sizes and means for adjustably supporting the protective plate to bring the selected opening to register with the fish.

16. A device for cleaning the visceral cavity of fish, comprising a rotative disk convexed to fit against an inner wall of said cavity and having its convex surface roughened, and a complemental non-rotative plate adapted to engage the opposite wall of the visceral cavity.

17. A device for cleaning the visceral cavity of fish, comprising a rotatively mounted disk having a scraping side face, a protective plate covering the scraping face and having a hole therein limiting the contact area of the scraping disk with the fish, and a guide plate secured to the protective plate and extending over the back side of the scraping disk to engage the other side wall of the visceral cavity.

18. A device for cleaning the visceral cavity of fish, comprising a rotative disk having a scraping surface on one side, a protective plate fitting closely to this scraping face and having a hole therein exposing a section of said face, and a guide engaging the opposite side wall of the visceral cavity.

19. A device for cleaning the visceral cavity of fish, comprising a rotative scraping disk, a front shield therefor having a plurality of holes of different size through which the scraper disk may act upon the fish, means for adjustably supporting the shield to determine the size of the opening to be used, and a buck shield adjustably supported from the front shield and adapted to have guiding engagement with side wall of the visceral cavity opposite that acted upon by the scraper disk.

20. A device for cleaning the visceral cavity of fish, comprising a rotative disk having a scraping side face, a shield having working openings covering the scraping face, a frame upon which the scraping disk is journaled and from which the shield is supported, and spring presser fingers supported from the same frame and engaging the outer surface of the fish opposed to said shield and scraper disk.

21. A device for cleaning the visceral cavity of fish, comprising a scraper disk adapted to engage the inner wall of said cavity, and a shield protecting the scraping face of said disk except in an area which extends transversely of the path of movement of the fish, and means for adjusting the size of said exposed area.

22. A device for cleaning the visceral cavity of fish, comprising a rotative disk having a scraping side face, a shield protecting the fish from the major part of said scraping face, a pair of arms having a support common with the shield and extending to positions opposite its scraping face and separated lengthwise the path of travel of the fish, and spring presser bars secured to one of said arms and having sliding engagement with the other.

23. A scraping attachment for fish cleaning machines, comprising a rotative shaft extending transversely of and with one end adjacent the path of travel of the fish, a frame in which said shaft is journaled, a pivot support for one end of said frame permitting movement of the other end toward and from the passing fish, a yielding support acting to hold the moving end of the shaft toward the fish, a scraping disk secured to said shaft, a shield partly protecting the scraping face of the disk, and supported from the frame, and spring held presser members carried by said frame and engaging the fish to hold it toward the scraper disk.

24. A scraping attachment for fish cleaning machines, comprising a shaft having a vertically pivoting support at one end and constituting a frame for the attachment, a yielding support for the swinging end, a sleeve rotatively mounted on said frame shaft and constituting a driving member, driving means connecting with the pivoted end of this sleeve, a scraper disk secured to the swinging end of this sleeve, and spring held pressers carried by the frame shaft in position to engage and hold the fish toward the scraper disk.

25. A scraping attachment for fish cleaning machines, comprising a shaft having a vertically pivoting support at one end and constituting a frame for the attachment, a suspension rod for this frame, a stop limiting movement of the scraper attachment toward the fish, and a spring supporting the attachment from the suspension rod, a yielding support for the swinging end, a sleeve rotatively mounted on said frame shaft and constituting a driving member, driving means connecting with the pivoted end of this sleeve, a scraper disk secured to the swinging end of this sleeve, and spring held pressers carried by the frame shaft in position to engage and hold the fish toward the scraper disk.

26. A scraping attachment for fish cleaning machines, comprising a shaft having a vertically pivoting support at one end and constituting a frame for the attachment, a yielding support for the swinging end, a sleeve rotatively mounted on said frame shaft and constituting a driving member, driving means connecting with the pivoted end of this sleeve, a scraper disk secured to the swinging end of this sleeve, a shield carried by the frame shaft and covering the side of the disk which is toward the fish and having an opening exposing a limited area for action on the fish, and spring held pressers carried by the frame shaft in position to engage and hold the fish toward the scraper disk.

27. A scraping device for fish comprising a rotative member having a series of continuous grooves extending from the periphery toward the center and having discharge holes in said grooves.

28. A scraping device for fish comprising a rotative member having a series of continuous grooves extending from the periphery inwardly, and a shield therefor having an opening exposing a limited area of the scraping surface.

29. A scraping device for fish comprising a rotative member having a series of continuous grooves extending from the periphery inwardly and having discharge holes in said grooves, and a shield for said member having an opening exposing a limited area of the scraping surface.

Signed at Seattle, Washington, this 18th day of April, 1916.

BENJAMIN R. BRIERLY.
EDWARD H. WAUGH.

Copies of this patent may be obtained for five cents each, by addressing the "Commissioner of Patents, Washington, D. C."